(12) United States Patent
Lai et al.

(10) Patent No.: US 7,573,673 B2
(45) Date of Patent: Aug. 11, 2009

(54) AIR BAFFLE DEVICE WITH A PLURALITY OF METAL PLATES FOR REDUCING DISK STACK VIBRATION IN MEDIA SERVOWRITER

(75) Inventors: Kien-Wee Lai, Singapore (SG); Wel-Min Wang, Palo Alto, CA (US); Jui-Kiat Goh, Singapore (SG); Wai-Kuen Koh, Singapore (SG)

(73) Assignee: LaserResearch (S) Pte Ltd, Singapore (SG)

( * ) Notice: Subject to any disclaimer, the term of this patent is extended or adjusted under 35 U.S.C. 154(b) by 625 days.

(21) Appl. No.: 11/229,597

(22) Filed: Sep. 20, 2005

(65) Prior Publication Data

US 2006/0061905 A1 Mar. 23, 2006

Related U.S. Application Data

(60) Provisional application No. 60/611,223, filed on Sep. 20, 2004.

(51) Int. Cl.
G11B 33/14 (2006.01)
(52) U.S. Cl. .................................. 360/97.03
(58) Field of Classification Search .... 360/97.01–97.12
See application file for complete search history.

(56) References Cited

U.S. PATENT DOCUMENTS

| 6,097,568 | A | 8/2000 | Ekhoff |
| 6,600,625 | B1 | 7/2003 | Munninghoff et al. |
| 6,785,082 | B2 | 8/2004 | Fiorvanti et al. |
| 6,788,493 | B1 | 9/2004 | Subramaniam et al. |
| 6,801,387 | B1 | 10/2004 | Rahman |
| 7,355,811 | B1 * | 4/2008 | Gifford et al. ............ 360/97.02 |
| 2006/0171064 | A1 * | 8/2006 | Han et al. ................ 360/97.01 |

* cited by examiner

*Primary Examiner*—A. J. Heinz
(74) *Attorney, Agent, or Firm*—Lawrence Y D Ho & Associates Pte. Ltd.

(57) ABSTRACT

The present invention provides an air baffle device for reducing disk vibration of a disk drive, where the air baffle device comprises a plurality of metal plates, and a fastening means for assembling the plurality of metal plates into a multi-layered structure. In another aspect of the present invention, there is provided an air baffle device for reducing disk vibration of a disk drive, where the air baffle device comprises a plurality of metal plates, a plurality of spacers, and a fastening means for assembling the plurality of metal plates and spacers into a multi-layered structure. In yet another aspect of the present invention, there is provided a disk drive for enabling read-write on a plurality of disks, where the disk drive comprises a disk stack with the plurality of disks being stacked in parallel, a driving means for driving the disk stack at a high speed, a read-write means for reading from and writing onto the plurality of disks, and an air baffle device for reducing disk vibration of disks when being spin at high speed, wherein the air baffle device comprises a plurality of metal plates, and a fastening means for assembling the plurality of metal plates into a multi-layered structure.

16 Claims, 9 Drawing Sheets

AIR BAFFLE DEVICE WITH A PLURALITY OF METAL PLATES FOR REDUCING DISK STACK VIBRATION IN MEDIA SERVOWRITER

RELATED APPLICATION

This application claims the benefit under 35 U.S.C. 119(e) of U.S. Provisional Application Ser. No. 60/611,223, filed Sep. 20, 2004, which is herein incorporated by reference.

FIELD OF THE INVENTION

The present invention relates to multi-disk media servowriters and, more particularly, to an air baffle device employed in a media servowriter for reducing disk stack vibration during servo writing.

BACKGROUND OF THE INVENTION

In the offline disk media servo-writing scheme, the servo writing process is carried out before the disks are placed inside the hard drive. The disks are servo-written on dedicate equipment (media servowriter) in a cleanroom. One advantage of this scheme is that multiple disks can be servo written at any one time using the same set of hardware. In addition, as hard drives nowadays usually contain only one to two disks, in-drive servo-writing can take up a lot of cleanroom space and time. By servo-writing multiple disks outside the hard drive, the usage of cleanroom space and time can be substantially reduced.

The capacity of disk data storage devices has been increasing 30% every year for the last 20 years. One way to achieve this exponential growth of storage capacity is to keep increasing the data track density. In a current disk drive, the data track distance is around 0.000008" from track to track. There is also a need to spin disk stack faster to increase the data input/output throughput. Under the conditions of shrinking distance between tracks and increasing speed of spins of disk stack, the vibration reduction of disk stack during servo writing is essential to meet error rate performance requirements.

In a typical media servowriter, disks are stacked and packed in a hub that is attached to the rotating shaft of an air-bearing spindle motor. During servo-track writing, the rotary motion of the spindle shaft spins the hub and hence the disk pack it carries. Each read-write head is attached to a head suspension device that is connected to an actuator arm. The actuator arms carrying the read-write heads are inserted in-between the disks while reading or writing on the disk surfaces. The suspension, taking the form of a flat sheet of steel, has a bend that creates a spring mechanism to press the read-write head onto the disk surface. The read-write heads are, however, prevented from touching the disk surfaces by a layer of air current flowing beneath the heads when the disks are spinning.

It has been recognized that the air current flowing in-between spinning disks not only lifts up the read-write heads but also generates large quantity of air turbulence in the vicinity of the read-write heads at the same time. These strong air currents can agitate the actuator arms that carry the read-write heads, and shake the heads off their intended positions. The strong air currents can also push against the disk surfaces, inducing additional undesirable vibrations to the spinning disks.

There are some attempts made to address the problem of air currents generated in-between spinning disks in a media servowriter. U.S. Pat. No. 6,097,568 provides a data storage device with air dams to interrupt circumferential airflow near the surface of one or more spinning disks. The air dams are an array of fingers, where each finger is projected into the gap between two spinning disks so as to interrupt the airflow and reduce the likelihood of local turbulence and disk vibration.

U.S. Pat. No. 6,600,625 provides a disk drive with a fluid deflector for reducing fluid turbulence near a transducer device. The fluid deflector includes a deflector finger in close proximity to the slider of disk drive read/write head in order to reduce the fluid turbulence near transducer only. It does not address the problem of disk vibration.

U.S. Pat. No. 6,785,082 provides a disc drive servo track writer with a sealing camber filled with low density gas. When the disks are spin within the sealed chamber, it is believed that the low density gas causes lower vibration force for the spinning disks in comparison with operations under normal atmosphere condition. However, it requires complicate and expensive sealing scheme and tedious and time-consuming procedure to reclaim the low density gas. In addition, the benefit of disk vibration reduction resulting from using of low density gas is limited since the nature of gas turbulence is still there.

U.S. Pat. No. 6,788,493 discloses a fluid diffuser for reducing fluid velocity near disk surfaces in a rotating disk storage device. The fluid diffuser includes one or more stationary diffuse wings, where one or more of the diffuser wings can extend between two of the storage disks. The diffuser wings are strategically located on the upstream of read/write head slider and hopefully to reduce air speed such that to have less "chance" to affect flying head slider and incur vibration.

U.S. Pat. No. 6,801,387 discloses methods to reduce the whirling air vortices which are normally formed at the disc tip. For example, the outer edge of the disc surface may be gradually thinned down to a sharp tip; a flow obstruction may be incorporated in the shroud adjacent the edge of the disc tip.

In yet another prior art, the air baffle is a solid metal block with separate circular slot trenches for individual disks. The air baffle is fully closed on all side ends except the one end for introducing the disks stack into the baffle. The air volume between any two disks on the disk stack is minimized to reduce the amount of air currents. However, due to the closed side ends, substantial amount of air currents can be present at the side end that is left open. Fabrication of such an air baffle is also a difficult task, as it requires precise removal of material in thin and yet deep trenches. Cutting blades easily get caught in the removal process and break off. Due to the tight dimensional tolerance required for the slot trenches, the half-done block of metal has to be scraped and the machining process restarted using a new metal block. This increases the cost of fabricating such an air baffle tremendously

SUMMARY OF THE INVENTION

Therefore, one objective of the present invention is to reduce disk vibrations in a disk drive with the disks being spin at high speed. When the disks spin, strong air turbulence can be present, inducing vibrations to the disks and the actuator arms in the vicinity. Such vibrations are undesirable as they lead to non-uniformity in the spacing of the magnetic tracks that are written on the disk surface. In order to reduce the disk vibration during disk spinning, the present invention provides a disk drive with an air baffle device that inserts a baffle plate between two disks of spinning disk stack, where the baffle plate chokes off air flow, creates a highly damped disk stack dynamic system, and reduces air turbulence, resulting in reduced read/write head slide vibration and disk bluffing.

In one aspect of the present invention, there is provided an air baffle device for reducing disk vibration of a disk drive, where the air baffle device comprises a plurality of metal plates, and a fastening means for assembling the plurality of metal plates into a multi-layered structure, wherein each plate has a flat recess on its one or two surfaces so that the multi-layered structure has a plurality of slots formed by two adjacent plates; thereby when the air baffle device is inserted into a disk stack, every disk in the disk stack is in parallel on both surfaces to the metal plates. In one embodiment, the plurality of metal plates are fabricated to high accuracy of thickness and flatness as so to assure a similar precision level of parallelism between two plates. In another embodiment, the metal plates are spaced such that when the air baffle device is inserted to the disk stack, the air gap between every disk surface and the facing metal plate surface is no larger than 10 mils. In yet another embodiment, the fastening means comprises a plurality of screws and bolts. In yet still another embodiment, the area of a disk covered by the metal plates is more than 30%.

In another aspect of the present invention, there is provided an air baffle device for reducing disk vibration of a disk drive, where the air baffle device comprises a plurality of metal plates, a plurality of spacers, and a fastening means for assembling the plurality of metal plates and spacers into a multi-layered structure, wherein the spacers are positioned between two plates so that the multi-layered structure has a plurality of slots formed by two adjacent plates; thereby when the air baffle device is inserted into a disk stack, every disk in the disk stack is in parallel on both surfaces to the metal plates. In one embodiment, the plurality of metal plates are fabricated to high accuracy of thickness and flatness as so to assure a similar precision level of parallelism between two plates. In another embodiment, the metal plates are spaced such that when the air baffle device is inserted to the disk stack, the air gap between every disk surface and the facing metal plate surface is no larger than 10 mils. In another embodiment, the metal plates have recesses on their one or two surfaces so as to form part of the slot space. In another embodiment, the spacers are metal spacer rings. In another embodiment, the fastening means comprises a plurality of screws and bolts. In another embodiment, the area of a disk covered by the metal plates is more than 30%.

In yet another aspect of the present invention, there is provided a disk drive for enabling read-write on a plurality of disks, where the disk drive comprises a disk stack with the plurality of disks being stacked in parallel, a driving means for driving the disk stack at a high speed, a read-write means for reading from and writing onto the plurality of disks, and an air baffle device for reducing disk vibration of disks when being spin at high speed, wherein the air baffle device comprises a plurality of metal plates, and a fastening means for assembling the plurality of metal plates into a multi-layered structure; wherein each plate has a flat recess on its one or two surfaces so that the multi-layered structure has a plurality of slots formed by two adjacent plates; thereby when the air baffle device is inserted into a disk stack, every disk in the disk stack is in parallel on both surfaces to the metal plates.

In yet still another aspect of the present invention, there is provided a disk drive for enabling read-write on a plurality of disks, where the disk drive comprises a disk stack with the plurality of disks being stacked in parallel, a driving means for driving the disk stack at a high speed, a read-write means for reading from and writing onto the plurality of disks, and an air baffle device for reducing disk vibration of disks when being spin at high speed, wherein the air baffle device comprises a plurality of metal plates, a plurality of spacers, and a fastening means for assembling the plurality of metal plates and spacers into a multi-layered structure; wherein the spacers are positioned between two plates so that the multi-layered structure has a plurality of slots formed by two adjacent plates; thereby when the air baffle device is inserted into a disk stack, every disk in the disk stack is in parallel on both surfaces to the metal plates.

The above and other objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention. However, it will be understood by those skilled in the relevant art that the present invention may be practiced without these specific details. In other instances, well-known methods, procedures, and components have not been described in detail so as not to obscure the present invention.

Throughout this application, where publications are referenced, the disclosures of these publications are hereby incorporated by reference, in their entireties, into this application in order to more fully describe the state of art to which this invention pertains.

The present invention is intended to provide an air baffle device for reducing disk vibrations during high speed spinning of the disk stack. Briefly, the air baffle device is assembled from multiple slabs of non-magnetic metal plates, each of which has well-controlled thickness. By maintaining optimal air gaps between the disk and the facing surface of each plate, air currents induced by the surfaces of the spinning disks will be minimized. In addition, when the side ends of the air baffle device are open to the surrounding, any air currents that may be flowing along the surfaces of the disks will be smoothly channeled away to the vicinity without generating large amount of turbulence, and particle contamination will be purged away from head and disk interface area and greatly enhance system reliability. Furthermore, the air baffle device can be easily fabricated and assembled. While the following description will use specific samples and refer to the drawings, it is to be appreciated that the samples and drawings are used for the sole purpose of illustration. Unless specifically stated, the shape, dimension, and size will not be limited to the description.

Figure 1:
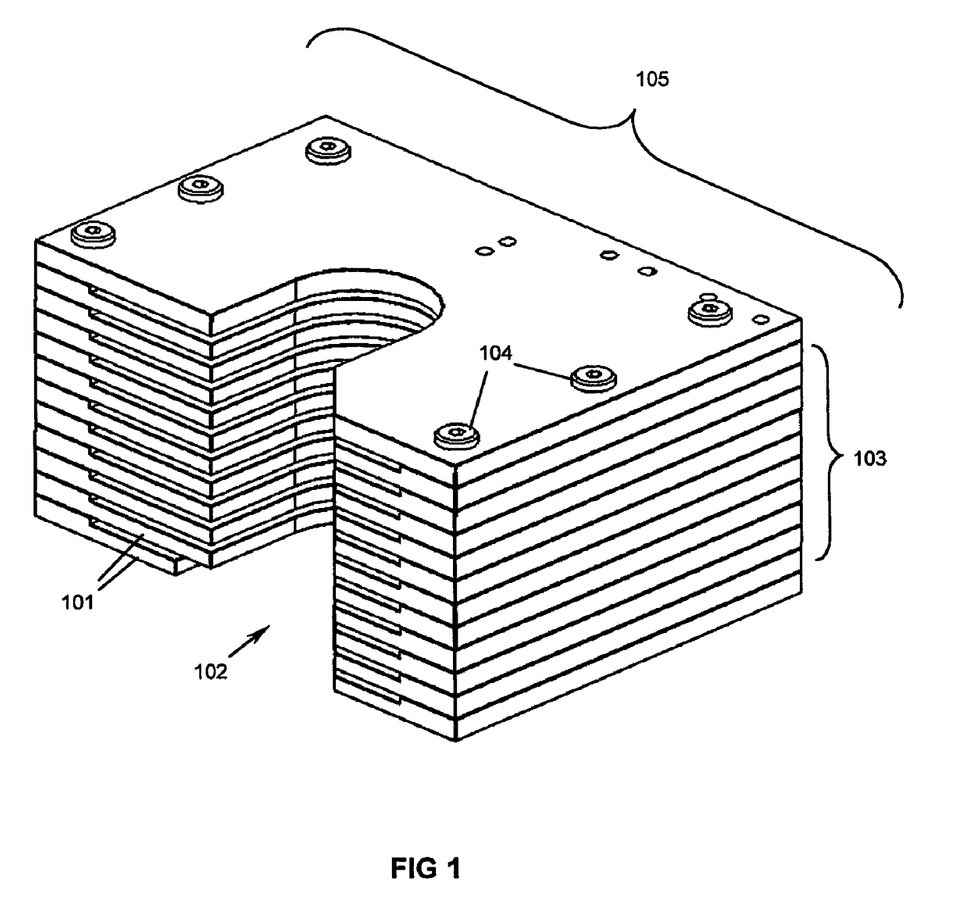
FIG. 1 is a perspective view of the air baffle device in accordance with one embodiment of the present invention.

Now referring to FIG. 1, there is provided an air baffle device 105 in accordance with one embodiment of the present invention. Instead of building the air baffle from a solid block of metallic material, the air baffle device 105 comprises a plurality of flat metal plates 101 that are accurately stacked together to form a layered structure. There is one slot between two metal plates for receiving one disk. In this embodiment as shown in FIG. 1, the air baffle device has been carved out from the side of disk insertion to form one opening for accommodating the disk stack as detailed hereinafter.

Figure 2:
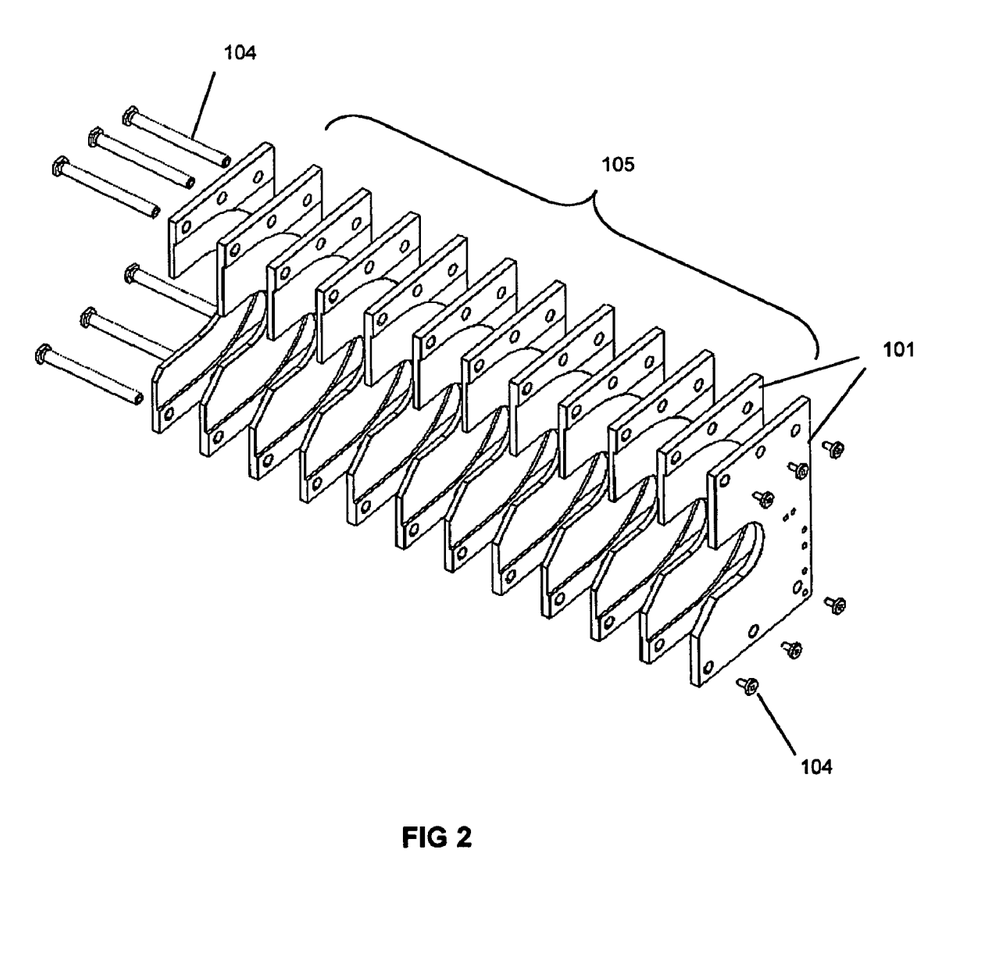
FIG. 2 is an exploded view of the air baffle device as shown in FIG. 1.

Referring now to FIG. 2, there is provided an exploded view of the air baffle device 105. The air baffle device comprises a plurality of the metal plates 101, screws and bolts 104. In one embodiment as shown in FIG. 1 and FIG. 2, the air baffle device 105 comprises one surface plate that has two uniform and smooth surfaces, and a plurality of other plates that have one a C-shaped recess on one of their surfaces, wherein the C-shaped recess covers only one side of the metal plates so that when the metal plates are stacked into the air baffle device, there is only one side of the device having the pathway 102 for the disks to be inserted. When the metal plates are assembled into the air baffle device 105, the recesses will form the in-between plate spaces into which the disks can be inserted. The inner metal plates 103 usually have the same thickness. These plates are preferably precisely ground at the same time to the desired thickness to eliminate thickness variation that can result from machining these plates in different batches. The flat metal plates 101, 103 are clamped together using bolts and screws 104 to form the air baffle device 105. In one embodiment, the screws 104 are clamped by precise torque to allow even clamping on the metal plates 101, 103. It is to be appreciated that the inner metal plates 103 may be ground on both surfaces so as to form the in-between plate spaces by two recesses from two adjacent plates. In addition, the shape of the metal plates is not critical either. Furthermore, while six bolts and screws are shown in FIG. 2, the number of screws and bolts and metal plates can be varied according to the specific assemblies.

Figure 3:
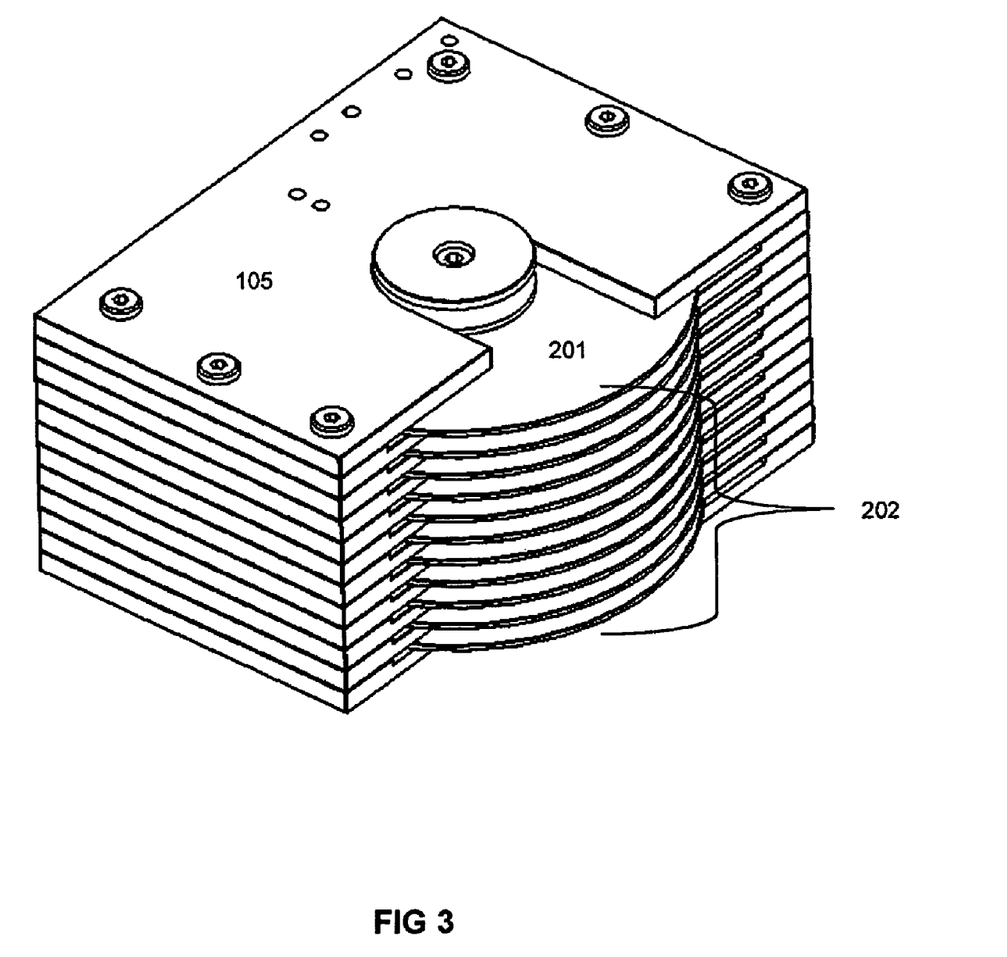
FIG. 3 is a perspective view of the air baffle device with inserted disk stack in accordance with one embodiment of the present invention.
Figure 4A:
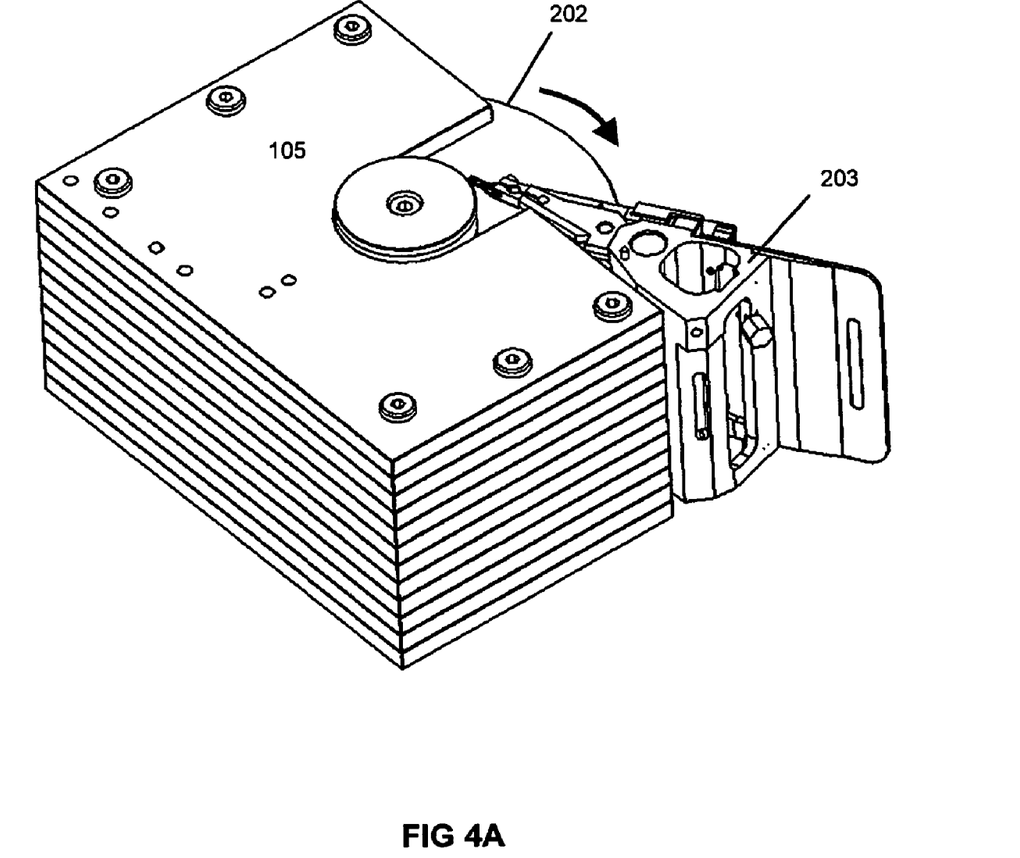
FIG. 4A is a perspective view of the air baffle device with inserted disk stack and head stack device in accordance with one embodiment of the present invention.
Figure 4B:
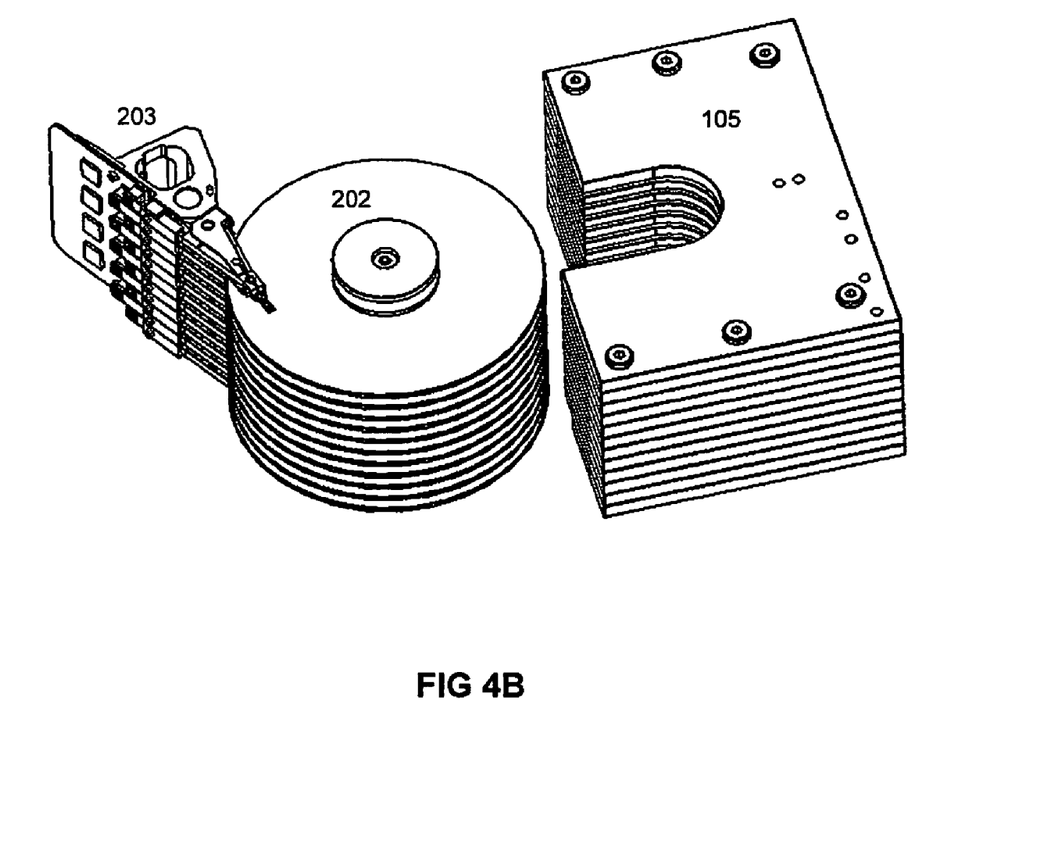
FIG. 4B is a perspective view of the air baffle device and un-inserted disk stack and head stack device in accordance with one embodiment of the present invention.

As shown in FIG. 1 and FIG. 2, the air baffle device may have a concave on the side where the pathway 102 exists. As shown in FIG. 3, the shape of the concave may be complementary to the shaft of the disk stack when a stack of disks 202 are inserted such that every disk 201 on the stack is positioned right between two adjacent metal plates 101, 103 of the air baffle device 105. FIG. 4A shows a read-write head device 203 that is positioned onto the inserted disks. FIG. 4B shows the read-write head device 203 positioned onto the stack of disks before the disks are inserted into the air baffle device 105.

Figure 5:
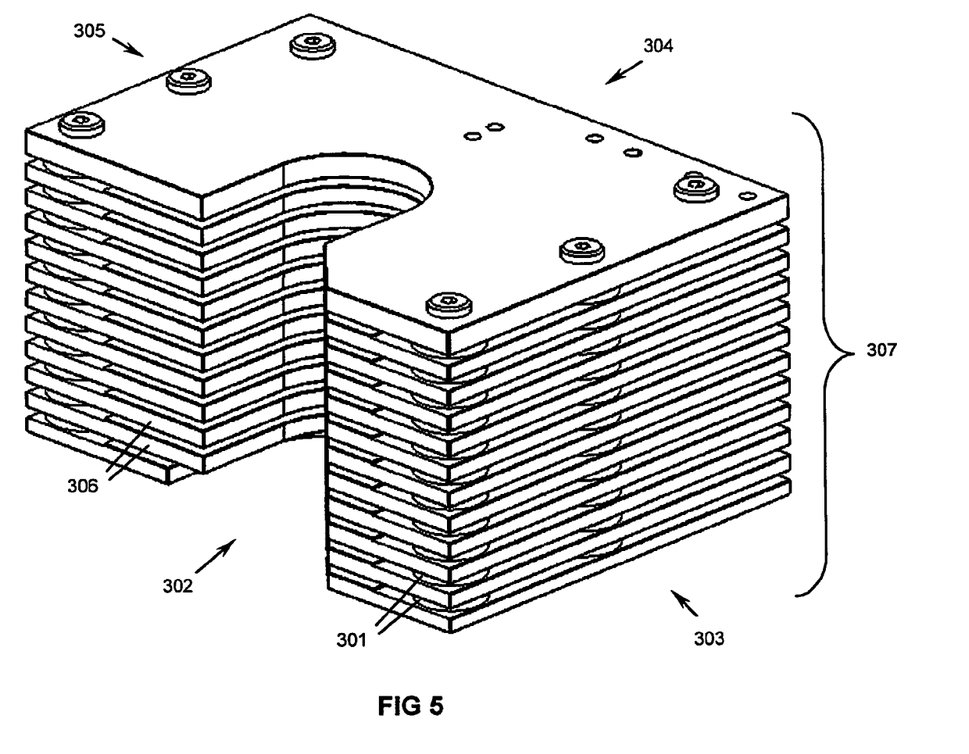
FIG. 5 is a perspective view of the air baffle device in accordance with another embodiment of the present invention.
Figure 6:
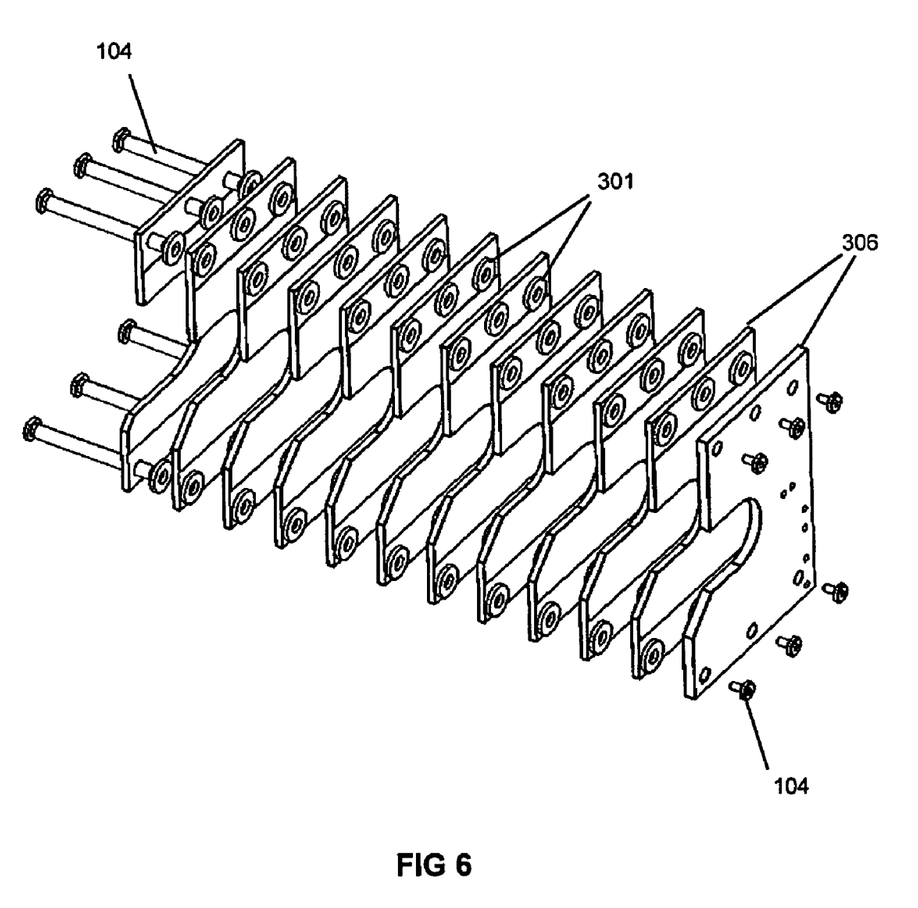
FIG. 6 is an exploded view of the air baffle device as shown in FIG. 5.

Now referring to FIG. 5, there is provided an air baffle device in accordance with another embodiment of the present invention. The air baffle device 307 comprises a plurality of metal plates 306 and spacers 301. The metal plates 306 and spacers 301 are precisely ground to the desired thickness. In the exploded view as shown in FIG. 6, the metal plates 306 and spacers 301 are alternately stacked and clamped together by a plurality of screws and bolts 104. The spacers 301 may be made of non-magnetic metallic material. The spacers 301 with precise thickness can be placed in-between the plates to stack the plates into an open, layered structure. The spacers 301 of the same thickness are preferably ground at the same time to the desired thickness, such that this thickness together with the thickness of the metal plates sum to be equal to the pitch of the spacing of the disks 201 on the said disk stack 202. The whole structure of the air baffle device 307 is clamped tightly together using a plurality of bolts and screws 104 that run through the layered structure. The screws 104 are clamped by precise torque to allow even clamping on the metal plates 306 and spacers 301.

For both the air baffle assemblies 105, 307 as shown in FIG. 1 and FIG. 5, the accuracy of maintaining the matching of pitch spacing between the metal plates 101, 306 and the disks 201 in the disk stack 202 is required to ensure that the air baffle assemblies 105, 307 can be inserted with the spinning disks stack 202 without any of the spinning disks 201 coming into contact with the metal plates 101, 306 of the air baffle assemblies. In the assemblies, a gap of 10 mils or less is maintained between the disk surface and the metal plates 101, 306 on both sides of the disk when the disk stack 202 is inserted into the air baffle device. As such, high accuracy of parallelism needs to be maintained for both the stacking of the air baffle metal plates 101, 306 and the disks 201 in the stack.

The ability to position the read-write head device 203 over the disk surfaces 201 at the desired locations determines the quality of servo-track patterns that are written. The air turbulence generated from the spinning stack of disks 202 affects the positioning of the read-write heads 203. The turbulent air flows in and out between the disks 201 push upon the surfaces of the disks, causes vibration to the spinning disks. The turbulence air can also excite the actuator arms that carry the read-write heads, displacing the heads away from their desired positions. The air baffle assemblies 105, 307 as described can greatly suppress the generation of air turbulence to laminar flow by greatly reducing the air volume between the disk surfaces. The insertion of the metal plates 101, 306 in-between two spinning disks reduces the air volume that can participate in air turbulence formation. With smooth laminar flow only, the air flow excitation of the spinning disks 201 will be very much reduced. The disk stack will spin with much lesser vibrations.

Figure 7:
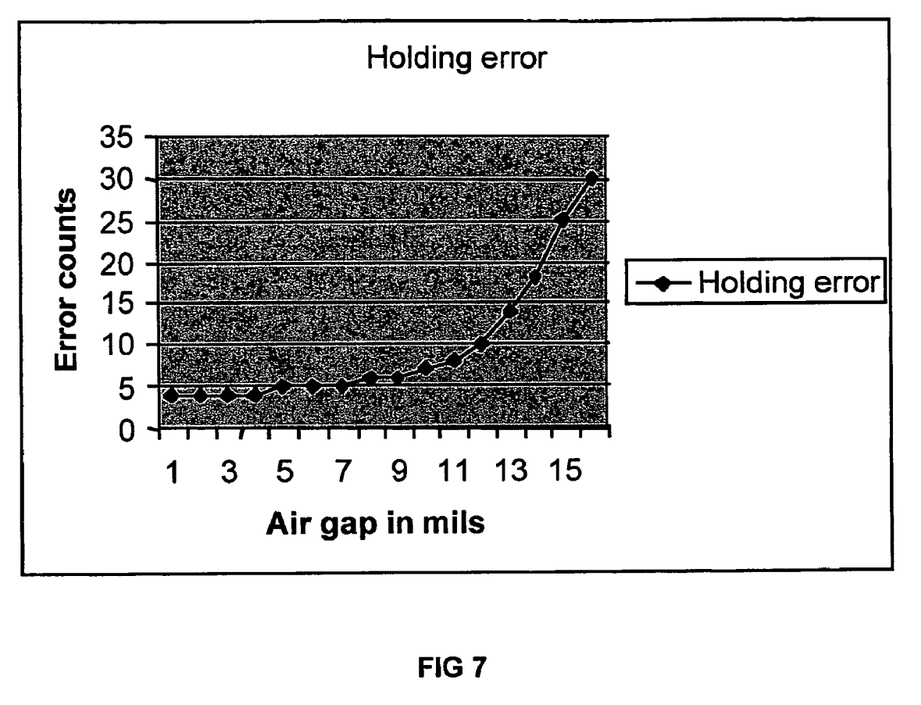
FIG. 7 is a graph showing relationship of the gap between the air baffle and disk vs. servo holding error.

The air volume that can cause air turbulence and vibration is proportional to the gaps between the disks and the metals. When the gap between the surface of a disk and the surface of a metal plate increases, the air volume actionable upon the disk increases, hence the errors will increase accordingly. FIG. 7 shows the relationship of air gap vs. servo holding error of the sensor derived from actual experiment results. Every count of holding error means that the servo position is deviate from its intended position of a finite amount usually in micro inches level. The count defined in Voice Coil Motor (VCM) is unit-less in the experiment. In order to define the acceptable vibration level, the amplification by the arm length resulted in the unit of micro-inch is essential to monitor. The graph shows that when the air gap increases, the perturbation on the disk stack 202 will increase. This directly shows that increasing of air gap results in higher holding error during servo writing the disks 201. A minimum of air gap with less than 10 mils is preferred in the device in order to achieve low holding error during servo writing. With the above air baffle assemblies 105, 307, the surface finish of metal plates 101, 103, 306 can be easily machined to the precise finish to ensure lower air gap during the device.

One evident advantage of the air baffle assemblies 105, 307 as disclosed in this application is that they can be easily fabricated by stacking up metal plates 101, 306. As for the air baffle device 307, any accumulative tolerance for stacking up of metal plates can be offset easily by modify spacers 301. In addition, when the side ends 302-305 of the air baffle device 307 are left open, this allows air flow generated by the spinning disks to be channeled away without obstacle along the walls of the metal plates 306. Particular contamination trapped between disks is purged out of sensitive area and the chance that Head Disk Interference causes scratches on the disk will be greatly reduced.

Figure 8:
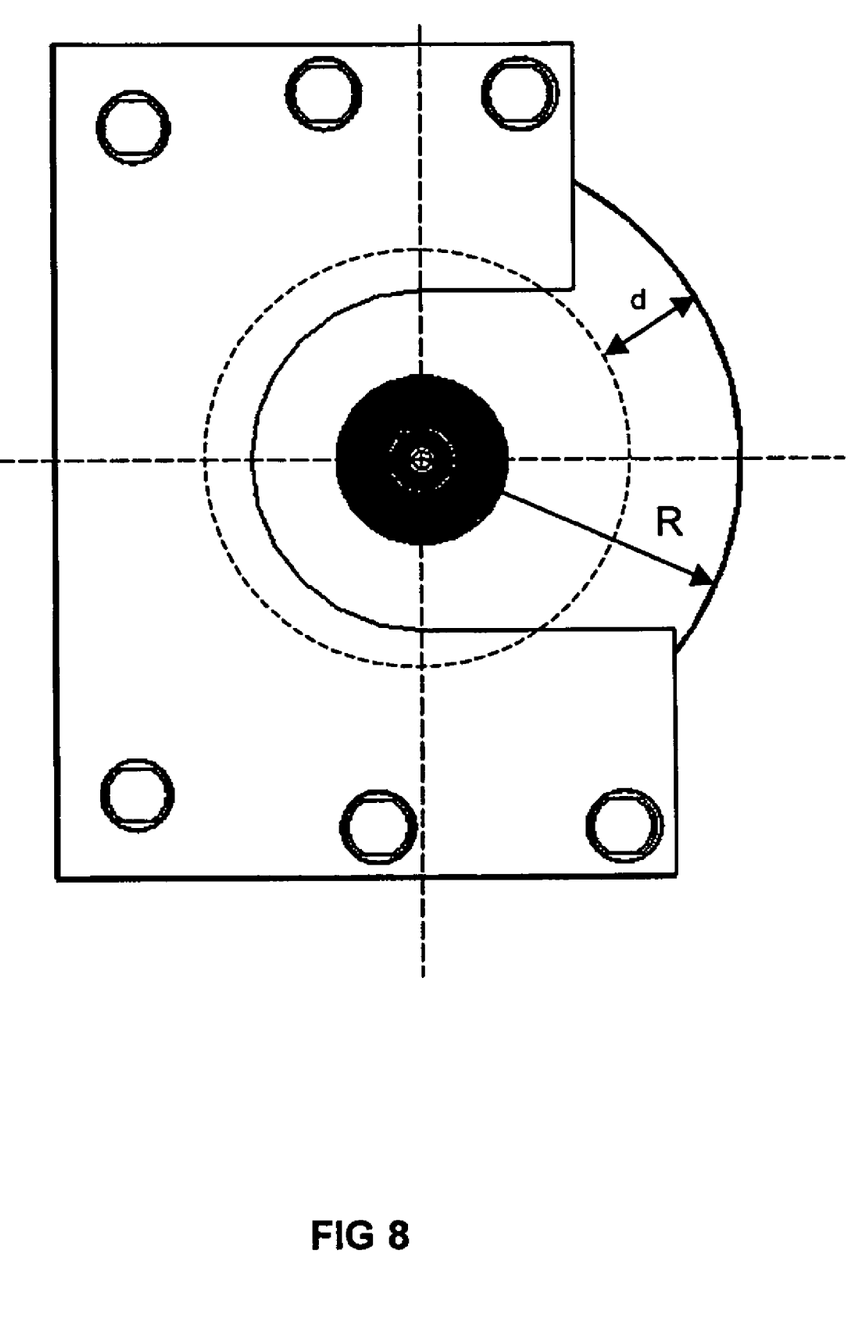
FIG. 8 illustrates the area coverage % (d/R).

This invention also discovers that the size of areas of a disk covered by the metal plates is one important factor affecting the servo writing. FIG. 8 illustrates the coverage % (d/R). As seen from Table 1, the metal plates 101, 306 of the air baffle 105, 307 may only extend a portion of disk area (⅓ of radius means the coverage % d/R more than or equal to 30%) near the outer edges of the disks 201 to minimize the holding errors. Table 1 shows the relationship between the area covered by the baffle from outer edge of disk vs. holding error. The outer edge of a spinning disk 201 travels at a linear speed higher than the other regions of the disk. When the baffle 105 or 307 is opened to the surrounding ambient, the air currents generated by the spinning surfaces at the disk edges are also of the highest velocity. By placing the metal plates of the air baffle close to the spinning disk surface at the edge region, the suppression of the air currents generation is most effective.

TABLE 1

The relationship between the disk coverage and the holding error counts.

| Holding Error counts | Coverage % d/R |
|---|---|
| 45 | 0% |
| 28 | 5% |
| 20 | 10% |
| 15 | 15% |
| 8 | 20% |
| 6 | 25% |
| 6 | 30% |
| 5 | 40% |
| 5 | 50% |
| 4 | 60% |
| 4 | 75% |

While the description has been focused on servowriters, it is to be appreciated that the principles of the present invention can be applied any high speed spinning disk devices when reduction of disk vibration is needed. For example, in a harddrive, an air baffle device in accordance with the principles of the present invention may be employed to reduce the disk vibration so as to improve the read-write qualities.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. An air baffle device for reducing disk vibration of a disk drive,
comprising of:
a plurality of metal plates;
a plurality of spacers; and
a fastening means for assembling the plurality of metal plates and spacers into a multi-layered structure;
wherein the spacers are positioned between two plates so that the multi-layered structure has a plurality of slots formed by two adjacent plates; thereby when the air baffle device is inserted into a disk stack, every disk in the disk stack is in parallel on both surfaces to the metal plates.

2. The air baffle device of claim 1, wherein the plurality of metal plates are fabricated to high accuracy of thickness and flatness as so to assure a similar precision level of parallelism between two plates.

3. The air baffle device of claim 1, wherein the metal plates are spaced such that when the air baffle device is inserted to the disk stack, the air gap between every disk surface and the facing metal plate surface is no larger than 10 mils.

4. The air baffle device of claim 1, wherein the metal plates have recesses on their one or two surfaces so as to form part of the slot space.

5. The air baffle device of claim 1, wherein the spacers are metal spacer rings.

6. The air baffle device of claim 1, wherein the fastening means comprises a plurality of screws and bolts.

7. The air baffle device of claim 1, wherein the area of a disk covered by the metal plates is more than 30%.

8. The air baffle device of claim 1, wherein the disk drive is a media servo writer.

9. A disk drive for enabling read-write on a plurality of disks,
comprising:
a disk stack with the plurality of disks being stacked in parallel;
a driving means for driving the disk stack at a high speed;
a read-write means for reading from and writing onto the plurality of disks; and
an air baffle device for reducing disk vibration of disks when spinning at high speed, wherein the air baffle device comprises:
a plurality of metal plates;
a plurality of spacers; and
a fastening means for assembling the plurality of metal plates and spacers into a multi-layered structure;
wherein the spacers are positioned between two plates so that the multi-layered structure has a plurality of slots formed by two adjacent plates; thereby when the air baffle device is inserted into a disk stack, every disk in the disk stack is in parallel on both surfaces to the metal plates.

10. The disk drive of claim 9, wherein the plurality of metal plates are fabricated to high accuracy of thickness and flatness as so to assure a similar precision level of parallelism between two plates.

11. The disk drive of claim 9, wherein the metal plates are spaced such that when the air baffle device is inserted to the disk stack, the air gap between every disk surface and the facing metal plate surface is no larger than 10 mils.

12. The disk drive of claim 9, wherein the metal plates have recesses on their one or two surfaces so as to form part of the slot space.

13. The disk drive of claim 9, wherein the spacers are metal spacer rings.

14. The disk drive of claim 9, wherein the fastening means comprises a plurality of screws and bolts.

15. The disk drive of claim 9, wherein the area of a disk covered by the metal plates is more than 30%.

16. The disk drive of claim 9, wherein the disk drive is a media servo writer.

* * * * *